US012699865B2

(12) United States Patent
Watt et al.

(10) Patent No.: US 12,699,865 B2
(45) Date of Patent: Aug. 4, 2026

(54) RFID CIRCUIT GEOMETRIES AND ANTENNA ARRANGEMENTS

(71) Applicant: Waters Technologies Corporation, Milford, MA (US)

(72) Inventors: Micah I. Watt, Holliston, MA (US); Benjamin Yeats, Melbourn (GB); Elena Maria Sanchez, Plymouth, MA (US); Michael Paul Lawrence, Smithfield, RI (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/967,077

(22) Filed: Dec. 3, 2024

(65) Prior Publication Data

US 2025/0190739 A1 Jun. 12, 2025

Related U.S. Application Data

(60) Provisional application No. 63/606,888, filed on Dec. 6, 2023.

(51) Int. Cl.
| | |
|---|---|
| *G06K 19/077* | (2006.01) |
| *G01S 13/74* | (2006.01) |
| *G01S 13/75* | (2006.01) |
| *H01Q 1/22* | (2006.01) |

(52) U.S. Cl.
CPC ............ *G06K 19/077* (2013.01); *G01S 13/74* (2013.01); *H01Q 1/2225* (2013.01)

(58) Field of Classification Search
CPC ........ G06K 19/077; G01S 13/74; G01S 13/75
USPC ......................................... 235/492
See application file for complete search history.

(56) References Cited

U.S. PATENT DOCUMENTS

| | | | |
|---|---|---|---|
| 2014/0347249 A1* | 11/2014 | Bourilkov | ................ H01Q 1/20 |
| | | | 343/904 |
| 2023/0266459 A1 | 8/2023 | Watt et al. | |
| 2023/0369896 A1* | 11/2023 | Suarez Sandoval | .. H02J 50/402 |

\* cited by examiner

*Primary Examiner* — Toan C Ly
(74) *Attorney, Agent, or Firm* — Schmeiser Olsen, PLLC; Timothy P. Collins, Esq.

(57) ABSTRACT

An apparatus and method for locating and identifying an object comprises attaching an RFID tag around a cylindrical object. The RFID tag comprises a flexible circuit constructed and arranged for conformably positioning about a cylindrical object and a plurality of antenna loops serially positioned about the flexible circuit. The antenna loops are overlapped with each other so that the flexible circuit receives an RF signal at a strength for transmission to the flexible circuit at any orientation of the RFID tag about the cylindrical object. The RF signal is received by at least one of the plurality of overlapping antenna loops. The source receives from the RFID tag a reply signal comprising identification data corresponding to the RFID tag. An identity and location are determined for the cylindrical object in response to the reply signal.

19 Claims, 5 Drawing Sheets

RFID CIRCUIT GEOMETRIES AND ANTENNA ARRANGEMENTS

PRIORITY

This application claims priority to U.S. provisional patent application No. 63/606,888 filed Dec. 6, 2023 and titled "RFID Circuit Geometries and Antenna Arrangements," the entirety of which is incorporated by reference herein.

FIELD OF THE INVENTION

The disclosed technology relates generally to radiofrequency devices. More particularly, the technology relates to radio frequency identification (RFID) tags, labels, stickers, and the like. More particularly, this invention relates to RFID tags positioned about cylindrical objects.

BACKGROUND

RFID is a well-known technology that can be implemented in various applications including car keys, highway toll systems, security access cards, and retail store items. RFID uses electromagnetic fields to identify and track tags attached to objects that include a radio transmitter/receiver (or transceiver) and a computer processor. An RFID system typically includes a tag and a wireless electronic device such as an RFID reader that outputs radio waves from a dipole antenna or the like which are received by the tag attached to an object. An RFID tag can utilize an induced antenna coil voltage, which energizes the tag so that the tag can communicate with the reader, namely, so that the tag can transmit an identifier to the reader for tracking the object to which the tag is attached.

In some applications, an RFID tag may be attached to a cylindrical object. However, the application of an RFID tag to a cylindrical object can result in areas of low or no coupling to the RFID transmitter based on the orientation of the cylindrical object as some orientations can alter the electromagnetic coupling of the RF signal, which can interfere with object identification. The efficiency of the interaction of the electromagnetic field formed by the received signal with the RFID tag depends on the efficiency of coupling the electromagnetic energy from the antenna and the tag. However, as shown in FIGS. 1A-1C, regions of a cylindrical object may not interact with the electromagnetic field due to the orientation of the tag about the cylindrical object with respect to the reader, which can impact the required communication between the reader and tag.

SUMMARY

In one aspect, a method for locating and identifying an object, the method comprises attaching an RFID tag around a cylindrical object. The RFID tag comprises a flexible circuit constructed and arranged for conformably positioning about a cylindrical object; and a plurality of antenna loops serially positioned about the flexible circuit. The method further comprises overlapping the serially positioned antenna loops with each other so that the flexible circuit receives an RF signal at a strength for transmission to the flexible circuit at any orientation of the RFID tag about the cylindrical object; receiving from an RF transmitting source the RF signal by at least one of the plurality of overlapping antenna loops; receiving, by the source from the RFID tag, a reply signal comprising identification data corresponding to the RFID tag; and determining an identity and location for the cylindrical object in response to the reply signal.

The antenna loops may be connected in series on the flexible circuit. The flexible circuit may include conductive elements for electrically coupling the serially connected antenna loops.

The conducting antenna loops may be connected in series to electrically simulate the use of several singular antenna loops for the purpose of communicating with the RF transmitting source.

The antenna loop may overlap each other along a length of the flexible circuit for providing a circumferentially symmetrical RF signal zone.

The overlapping antenna loops may strengthen an interaction with the electromagnetic field generated by the RF transmitting source relative to a tag orientation.

A number of the antenna loops may be directly proportional to a strength of interaction with the electromagnetic field generated by the RF transmitting source.

A first distal end of the flexible circuit may include a first antenna loop of the plurality of overlapping antenna loops and a second distal end of the flexible circuit opposite the first distal end may include a second antenna loop of the plurality of overlapping antenna loops. The second antenna loop may overlap the first antenna loop to form a 360 degree readable RF signal zone about the cylindrical object.

The method may further comprise positioning a ferrite shield between the flexible circuit and the cylindrical object.

The loops may include seven loops. The loops may be formed from a single antenna coil.

In another aspect, a system for locating and identifying an object comprises an RFID tag constructed and arranged for positioning around a cylindrical object. The RFID tag comprises a flexible circuit constructed and arranged for conformably positioning about a cylindrical object; and a plurality of antenna loops serially positioned about the flexible circuit, the serially positioned antenna loops overlapping each other, the antenna loops overlapped so that the circuit can receive an RF signal at a strength sufficient to power the circuit at any orientation of the RFID tag about the cylindrical object. An RF transmitting source generates an electromagnetic field received by at least one of the plurality of antenna loops. The RFID tag in response modulates an electromagnetic field generated by an RF transmitting source, the electromagnetic field transmitting identification data corresponding to the RFID tag. A processor determines an identity and location for the cylindrical object in response to the electromagnetic field.

The RF transmitting source may include an RFID reader.

The antenna loops may be connected in series to electrically simulate the use of several singular antenna loops for the purpose of communicating with the RF transmitting source.

The antenna loops may overlap each other along a length of the flexible circuit for providing a circumferentially symmetrical RF signal zone.

The overlapping antenna loops may strengthen an interaction with the electromagnetic field generated by the RF transmitting source relative to a tag orientation.

A number of the antenna loops may be directly proportional to a strength of interaction with the electromagnetic field generated by the RF transmitting source.

In another aspect, an RFID tag comprises a substrate constructed and arranged for conformably positioning about a cylindrical object; a plurality of antenna loops serially positioned about an outer circumferential region of the substrate, and constructed and arranged to interact with a radio frequency (RF) signal received from a source, the serially positioned antenna loops overlapping with each other; and a circuit on the substrate in communication with each of the antenna loops, the antenna loops overlapped so that the circuit can receive an RF signal at a strength sufficient to power the circuit at any orientation of the RFID tag about the cylindrical object.

The antenna loops may overlap each other along a length of the flexible circuit for providing a circumferentially symmetrical RF signal zone.

The overlapping antenna loops may strengthen an interaction with the electromagnetic field generated by the RF transmitting source relative to a tag orientation.

A number of the antenna loops may be directly proportional to a strength of interaction with the electromagnetic field generated by the RF transmitting source.

BRIEF DESCRIPTION OF THE DRAWINGS

The described advantages of this invention may be better understood when referring to the following descriptions in conjunction with the accompanying drawings. Like numerals within these drawings indicate like elements and features in various figures. For clarity, not every element or feature may be labeled in every figure. The drawings are not to scale and are meant to illustrate the principles of the invention.

DETAILED DESCRIPTION

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Moreover, features illustrated or described for one embodiment or example may be combined with features for one or more other embodiments or examples. Those of ordinary skill having access to the teaching herein will recognize additional implementations, modifications, and embodiments, as well as other fields of use, which are within the scope of the present disclosure as described herein.

Figure 1C:
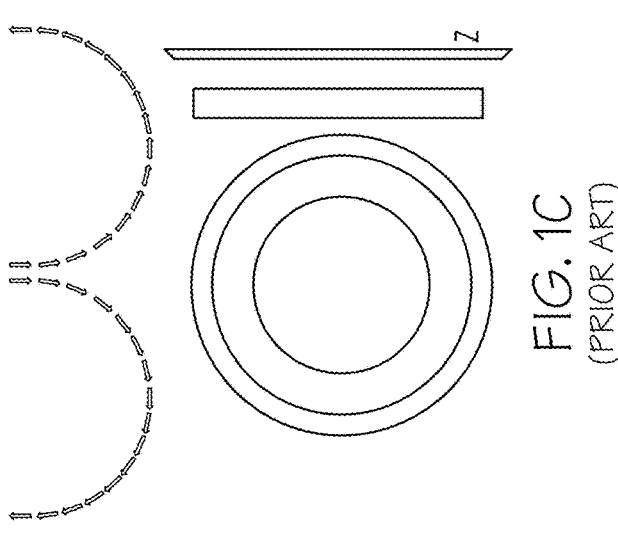
FIGS. 1A-1C are examples of a conventional RFID tag in various rotational positions when receiving an RF signal.
Figure 1B:
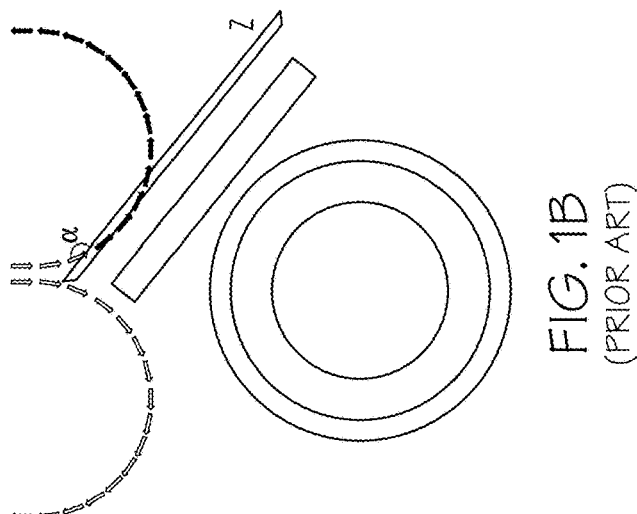
Figure 1A:
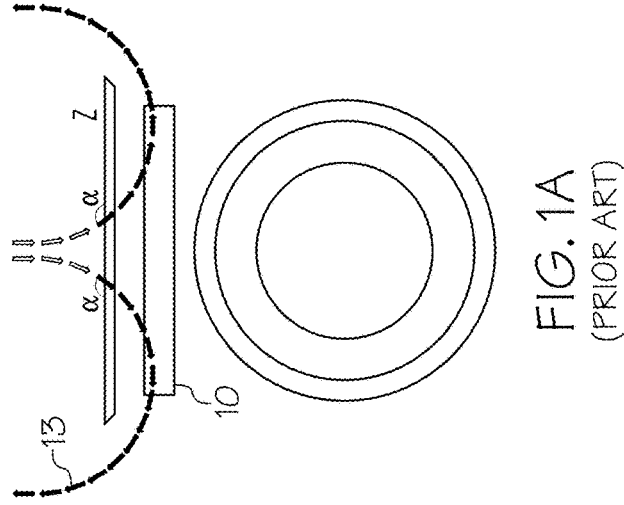

FIGS. 1A-1C are examples of a conventional RFID tag 10 in various rotational positions when receiving an RF signal. The RFID tag 10 includes a single antenna loop 12 formed of one or more antenna coils that interact with an RF signal 13 sent from a reader (not shown) or other source. In some embodiments, the RFID tag 10 is passive, and relies on the antenna coil(s) to induce a voltage from the RF signal 13 for operation and to energize the tag 10 so that the tag 10 can exchange signals including identifiers or the like with the reader. The induced voltage developed across the loop antenna coil is a function of the angle ($\alpha$) of the arrival signal. The tag 10 may include a rectifier that rectifies the induced AC voltage to provide a DC voltage for powering the device. In providing an energizing RF signal, some embodiments of the tag 10 do not require a battery or other external power source.

As shown in FIGS. 1B and 1C, a single RF signal zone (z) formed by the antenna loop 12, or more specifically, the zone where the receiving antenna responds to the electric field of the received signal inducing a current in the antenna loop 12 of the tag, does not allow for the circumferentially symmetrical tag interaction with the electromagnetic field emitted at all rotations of the RFID tag 10. This may result in the presence of dead spots between the RFID reader and the RFID tag 10, which can reduce the reader's ability to read the tag 10 to identify the cylindrical object associated with the tag 10.

Figure 2:
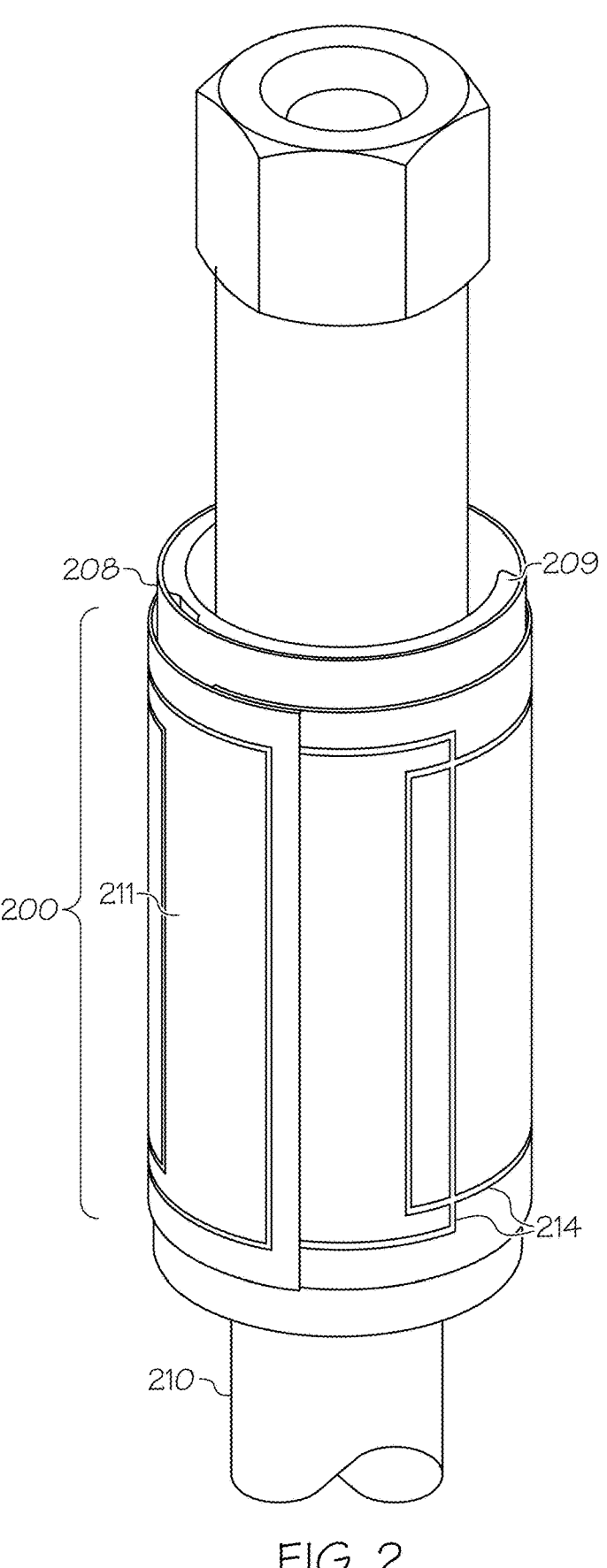
FIG. 2 is a perspective view of an RFID tag, in accordance with some embodiments.
Figure 5:
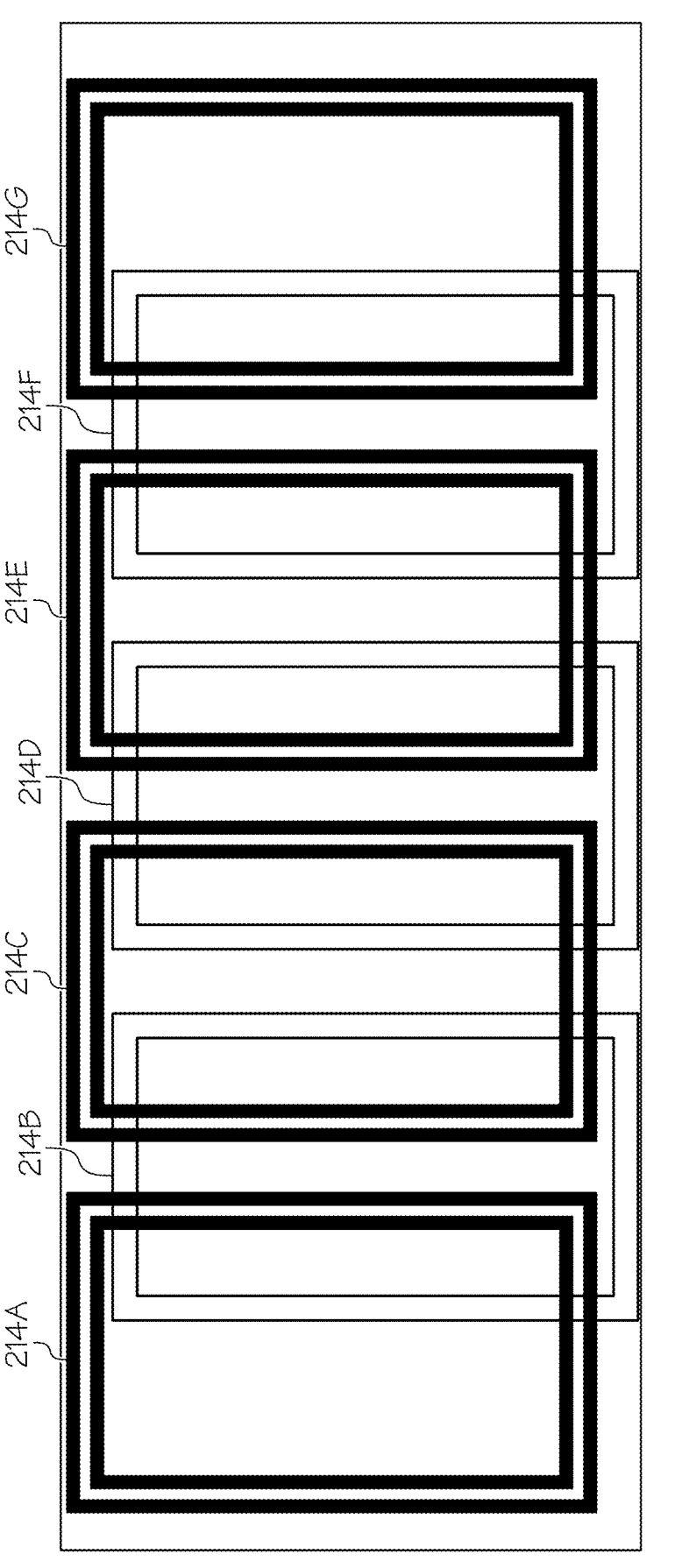
FIG. 5 is an example of an RFID tag with a plurality of antenna loops of a conducting antenna coil.

FIG. 2 is a perspective view of an RFID tag assembly including an RFID tag 200 wrapped about a cylindrical object 209, in accordance with some embodiments. In the assembly 200, an RFID tag includes multiple antenna loops 214 of a conducting antenna coil on a substrate 211, which may be part of a flexible circuit such as a printed circuit, which in turn can be wrapped around a cylindrical object. The substrate 211 may be formed of polyamide, but is not limited thereto. In addition to the antenna loops 214, positioned on the substrate 211 may include other electrical components such as wiring, circuits, and so on. In some embodiments, the tag 200 including substrate 211 is wrapped around an optional ferrite layer 208, which in turn is wrapped about a shielded polymer cylindrical object 209, which in turn is attached to a conductive cylindrical object 210. The antenna loops 214 present on the substrate 211, or more specifically, a flexible printed circuit of the substrate 211, are overlapped as shown in FIG. 5, and can wrap about the ferrite layer 208, allowing the assembly 200 to wrap about a cylindrical object. In particular, the ferrite layer 208 may be provided where the cylindrical object is metal. In that instance, the ferrite layer 208 is required to provide shielding so that the metal does not interfere with the electromagnetic field projected by the RF reader. Accordingly, the ferrite layer 208 can be used to enhance performance, specifically when wrapped around a conductive cylindrical object.

Referring again to FIG. 5, the RFID tag includes multiple antenna loops 214A-214G (generally, 214) of a conducting antenna coil, wherein each of the antenna loops 214 serially positioned and overlapping each other to strengthen transmitter field interaction, or increase strength and symmetry of tag interaction, thereby eliminating any areas of weak signal strength by creating circumferentially symmetrical tag interactions with an electromagnetic field when the RFID tag 200 is wrapped around a cylindrical object 210. The antenna loops 214 overlap varyingly, i.e., at non-identical dimensions, along the length of the substrate 211 of the tag.

The tag 200 having the antenna loops 214 is wrapped around the cylindrical object 209 that is shielded with the ferrite layer 208 in a manner which results in the ferrite layer 208 existing between the tag 200 and the cylindrical object 209. The tag 200 when wrapped around the cylindrical object 209 in this manner overlaps its opposite end to create a radially symmetrical interaction capability with the transmitter's electromagnetic field. In particular, the tag 200 modulates an electromagnetic field generated by a separate transmitter (RF reader). The modulated electromagnetic field acts as a carrier for identification data. Thus, the tag overlaps with itself to create a 360 degree readable RF signal zone to detect the transmitter's electromagnetic field at any orientation about a 360 degree circumference about a longitudinal axis along with which the tag 200 extends. In some embodiments, the overlapped end has a finished diameter greater than or equal to 0.25" to create a circumferentially symmetrical interaction capability with the transmitter's electromagnetic field. In some embodiments, the tag 200 when wrapped around the cylindrical object 209 overlaps its opposite end resulting in a finished diameter greater than or equal to 0.527" and less than or equal to 0.67" to create a circumferentially symmetrical interaction capability with the electromagnetic field emitted by the transmitter. In some embodiments, the tag 200 when wrapped around the cylindrical object 209 overlaps its opposite end resulting in a finished diameter greater than or equal to 0.73" and less than or equal to 0.8" to create a circumferentially symmetrical interaction capability with the transmitters electromagnetic field. In some embodiments, the tag 200 when wrapped around the cylindrical object 209 overlaps its opposite end resulting in a finished diameter less than or equal to 1" to create a circumferentially symmetrical interaction capability with the transmitters electromagnetic field. In other embodiments, other diameters may equally apply, for example, ranging from 0.25"-1.5". Although the foregoing dimensions are included in some embodiments, other embodiments may include other dimensions and are not limited to the foregoing. In some embodiments, the tag 200 is wrapped around a material forming the cylindrical object 209. In general, the tag 200 can wrap about any object formed of any material.

Figure 3:
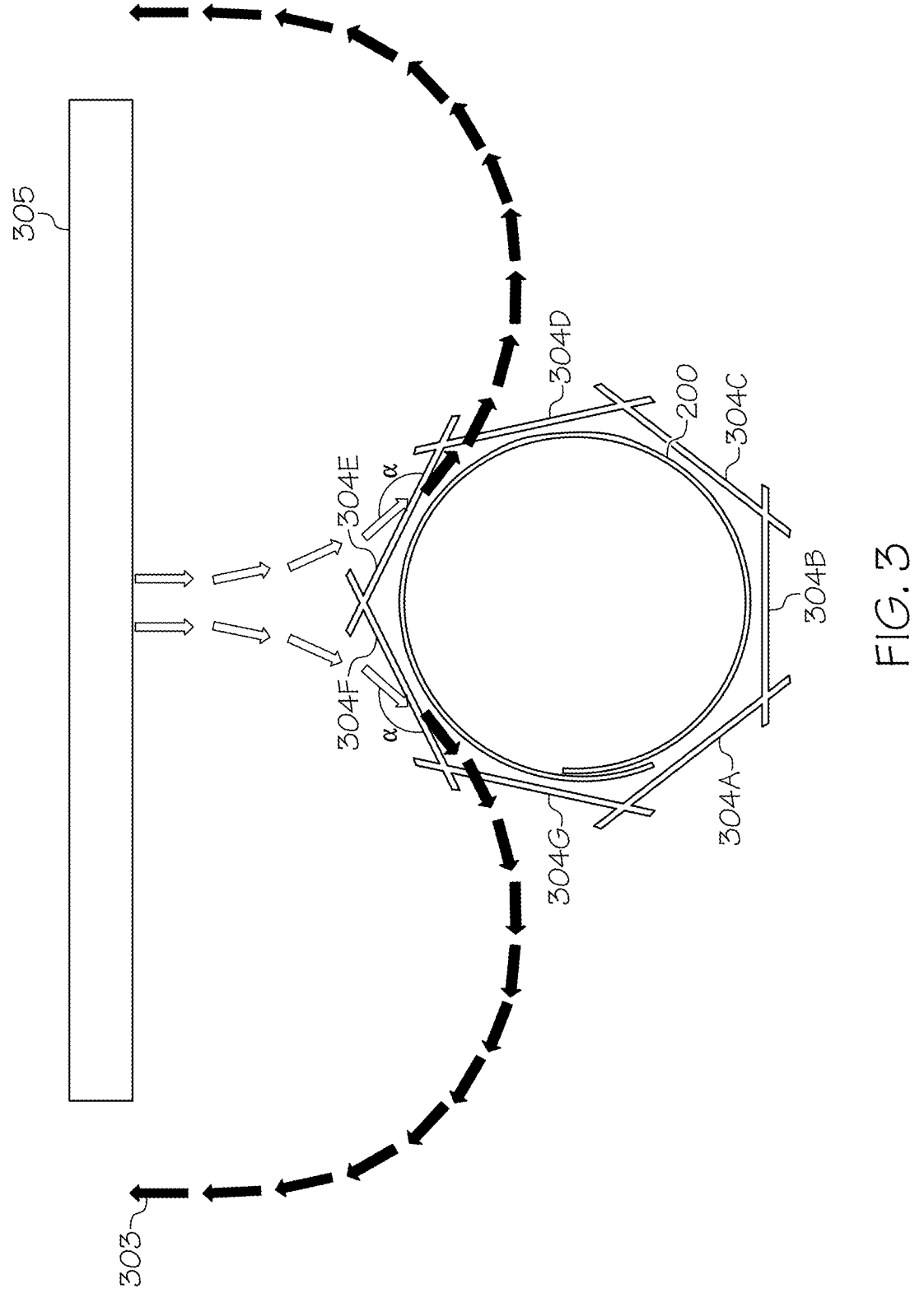
FIG. 3 is an example of an RFID tag with a plurality of antenna loops interacting with an RF signal projected from a single source.

With further reference to FIG. 3, in some embodiments, the RFID tag 200 comprises a plurality of antenna loops (e.g., 214 shown in FIG. 2) forming signal zones 304A-304G, respectively, or zones (Z) shown in FIG. 2, when interacting with an RF signal 303 projected from a single source, such as a transmitter antenna board 305 of an RFID reader (not shown). Here, the RFID reader, or other RF transmitting source, can receive a reply signal in a form of a modulation of the transmitted electromagnetic field, which comprises identification data corresponding to the tag. Although seven zones 304 formed by antenna loops are shown, the inventive concept is not limited thereto, and other embodiments may include a different number of antenna loops. The loops may be part of a single antenna coil. The tag 200 includes circumferentially symmetrical RF signal zone created by multiple overlapping antenna loops at the RFID tag 200. The rotational position of the RFID tag 200 portrayed in FIG. 3 models the least optimal position of the RFID tag with respect to receiving RF signal 303. Even in this sub optimal position, in which one of the RF signal zones 304 is not parallel with the antenna board 305, the overlapping RF signal zones 304 created by the overlapping antenna loops allow for the RF signal 303 to be received at an acceptable angle α. The closer the angle α is to 90 degrees, the better the RF signal 303 can be received by the RF signal zone 304 of the RFID tag 200. Accordingly, overlapping antenna loops strengthen an interaction with the electromagnetic field generated by the RF transmitting source relative to the tag orientation.

Figure 4A:
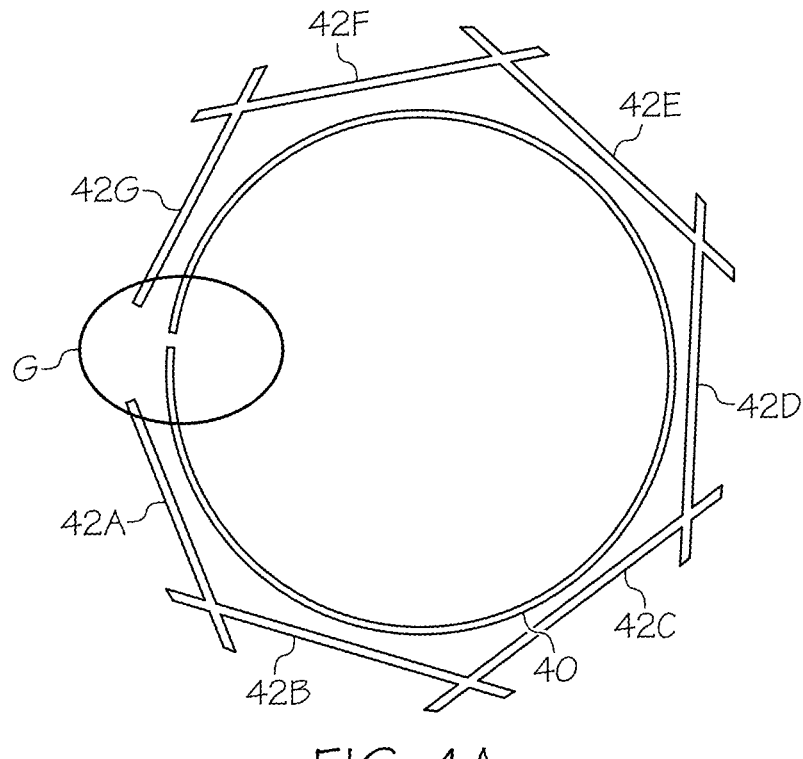
FIG. 4A is a demonstration of an RFID tag with a plurality of antenna loops without the RFID tagged overlapping itself.
Figure 4B:
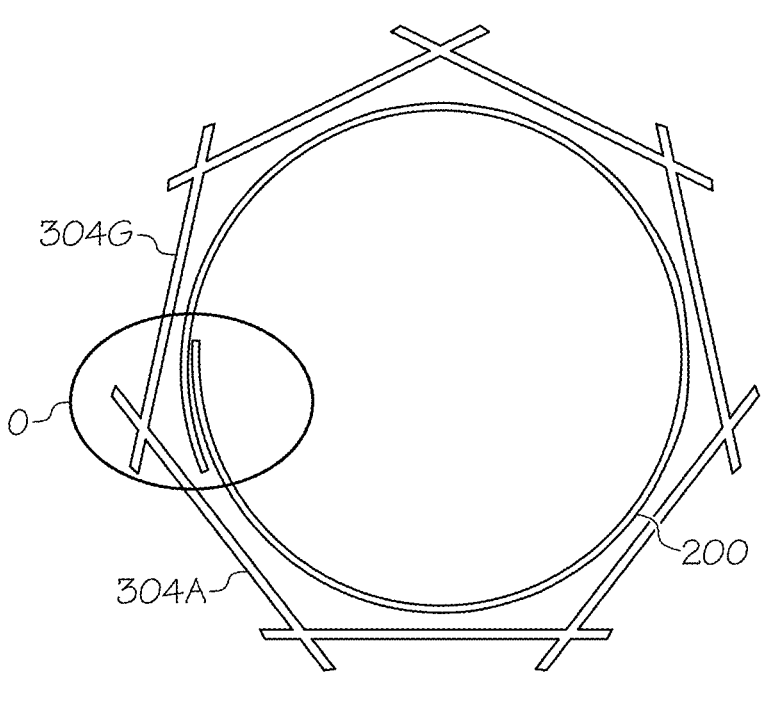
FIG. 4B is a demonstration of an RFID tag with a plurality of antenna loops with the RFID tagged overlapping itself, in accordance with some embodiments.

FIG. 4A is a demonstration of an RFID tag 40 with a plurality of antenna loops without the RFID tag overlapping itself. FIG. 4B is a duplicate view of the RFID tag 200 of FIGS. 2 and 3 to illustrate a comparison to the RFID tag 40 of FIG. 4A. In particular, FIG. 4B is a demonstration of an RFID tag with a plurality of antenna loops with the RFID tagged overlapping itself.

In particular, in FIG. 4A a gap (G) is present between RF signal zones 42A and 42G since there is also a gap at a corresponding region of the RFID tag, i.e., no overlapping antenna loops at gap (G). At the location of this demonstrated gap (G), an RF signal would not be functionally received, resulting in a lack of circumferentially symmetrical RFID functionality. As shown in FIG. 4B, on the other hand, there is no such gap and a circumferentially symmetrical RF signal zone 304 is portrayed by overlapping zones 304A-304G, resulting in circumferentially symmetrical RFID functionality. Each antenna loop geometry is optimized to interact with the electromagnetic field of the transmitting RF source. Instead of employing multiple independent RFID tags to achieve the same interaction with the field, the antenna loops are combined to minimize circuitry and emulate independent RFID tags, and therefore the loop arrangement can simulate the use of different singular antenna loops.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A method for locating and identifying an object, the method comprising:
attaching an RFID tag around a cylindrical object, the RFID tag comprising:
a flexible circuit constructed and arranged for conformably positioning about a cylindrical object; and
a plurality of antenna loops serially positioned about the flexible circuit, the method further comprising:
wrapping the RFID tag around the cylindrical object such that a first distal end of the flexible circuit including a first antenna loop of the plurality of antenna loops overlaps with a second distal end of the flexible circuit, the second distal end including a second antenna loop of the plurality of antenna loops;
overlapping the serially positioned antenna loops with each other including overlapping the second antenna loop with the first antenna loop to form a continuous 360 degree readable RF signal zone about the cylindrical object so that the flexible circuit receives an RF signal at a strength for transmission to the flexible circuit at any orientation of the RFID tag about the cylindrical object;
receiving from an RF transmitting source the RF signal by at least one of the plurality of overlapping antenna loops;
receiving, by the source from the RFID tag, a reply signal comprising identification data corresponding to the RFID tag; and
determining an identity and location for the cylindrical object in response to the reply signal.

2. The method of claim 1, wherein the antenna loops are connected in series on the flexible circuit, and the flexible circuit includes conductive elements for electrically coupling the serially connected antenna loops.

3. The method of claim 2, wherein the conducting antenna loops connected in series electrically simulate the use of several singular antenna loops for the purpose of communicating with the RF transmitting source.

4. The method of claim 1, wherein the antenna loops overlap each other along a length of the flexible circuit for providing a circumferentially symmetrical RF signal zone, and wherein the first distal end is at one end of the length of the flexible circuit and the second distal end is an opposite end of the length of the flexible circuit as the first distal end.

5. The method of claim 1, wherein the overlapping antenna loops strengthen an interaction with the electromagnetic field generated by the RF transmitting source relative to a tag orientation.

6. The method of claim 1, wherein a number of the antenna loops is directly proportional to a strength of interaction with the electromagnetic field generated by the RF transmitting source.

7. The method of claim 1, further comprising providing a ferrite shield between the flexible circuit and the cylindrical object.

8. The method of claim 1, wherein the loops include seven loops.

9. The method of claim 1, wherein the loops are formed from a single antenna coil.

10. A system for locating and identifying an object, the system comprising:
    an RFID tag constructed and arranged for positioning around a cylindrical object, the RFID tag comprising:
        a flexible circuit constructed and arranged for conformably positioning about a cylindrical object; and
        a plurality of antenna loops serially positioned about the flexible circuit, wherein a first distal end of the flexible circuit includes a first antenna loop of the plurality of antenna loops and a second distal end of the flexible circuit opposite the first distal end includes a second antenna loop of the plurality of antenna loops, the serially positioned antenna loops overlapping each other, wherein the RFID tag is configured to overlap with itself when wrapped around the cylindrical object such that the second antenna loop overlaps the first antenna loop to form a continuous 360 degree readable RF signal zone, the antenna loops overlapped so that the circuit can receive an RF signal at a strength sufficient to power the circuit at any orientation of the RFID tag about the cylindrical object;
    an RF transmitting source that generates an electromagnetic field received by at least one of the plurality of antenna loops, wherein the RFID tag in response modulates an electromagnetic field generated by an RF transmitting source, the electromagnetic field transmitting identification data corresponding to the RFID tag;
    a processor that determines an identity and location for the cylindrical object in response to the electromagnetic field.

11. The system of claim 10, wherein the RF transmitting source includes an RFID reader.

12. The system of claim 10, wherein the antenna loops are connected in series to electrically simulate the use of several singular antenna loops for the purpose of communicating with the RF transmitting source.

13. The system of claim 10, wherein the antenna loops overlap each other along a length of the flexible circuit for providing a circumferentially symmetrical RF signal zone, and wherein the first distal end is at one end of the length of the flexible circuit and the second distal end is an opposite end of the length of the flexible circuit as the first distal end.

14. The system of claim 10, wherein the overlapping antenna loops strengthen an interaction with the electromagnetic field generated by the RF transmitting source relative to a tag orientation.

15. The system of claim 10, wherein a number of the antenna loops is directly proportional to a strength of interaction with the electromagnetic field generated by the RF transmitting source.

16. An RFID tag, comprising:
    a substrate constructed and arranged for conformably positioning about a cylindrical object;
    a plurality of antenna loops serially positioned about an outer circumferential region of the substrate, and constructed and arranged to interact with a radio frequency (RF) signal received from a source, wherein a first distal end of the substrate includes a first antenna loop of the plurality of antenna loops and a second distal end of the substrate opposite the first distal end includes a second antenna loop of the plurality of antenna loops, the serially positioned antenna loops overlapping with each other, wherein the RFID tag is configured to overlap with itself when wrapped around the cylindrical object such that the second antenna loop overlaps the first antenna loop to form a continuous 360 degree readable RF signal zone; and
    a circuit on the substrate in communication with each of the antenna loops, the antenna loops overlapped so that the circuit can receive an RF signal at a strength sufficient to power the circuit at any orientation of the RFID tag about the cylindrical object.

17. The RFID tag of claim 16, wherein the conducting antenna loops connected in series electrically simulate the use of several singular antenna loops for the purpose of communicating with the RF transmitting source.

18. The RFID tag of claim 16, wherein the antenna loops overlap each other along a length of the circuit for providing a circumferentially symmetrical RF signal zone, and wherein the first distal end is at one end of the length of the flexible circuit and the second distal end is an opposite end of the length of the flexible circuit as the first distal end.

19. The RFID tag of claim 16, wherein the overlapping antenna loops strengthen an interaction with the electromagnetic field generated by the RF transmitting source relative to a tag orientation.

* * * * *